United States Patent Office 3,269,940
Patented August 30, 1966

3,269,940
BACTERIA ACTIVATOR FOR USE IN SEPTIC TANKS
Everett P. Attaway, Joliet, Ill., assignor of one-half to Mabel C. Attaway, Joliet, Ill.
No Drawing. Filed Apr. 16, 1963, Ser. No. 273,315
2 Claims. (Cl. 210—11)

My invention relates to a bacteria activator for use in septic tanks and the method of making the same.

An object of my invention is to reduce by bacteria growth and digestion, solid and raw sewage into a fine silt to be further devoured by bacteria and discharged in a fluid state from the septic tank through the field tile.

More particularly, the invention has as a specfic object the creating of bacteria growth within a septic tank which will be active to digest and reduce solid and raw sewage to a substantially fine silt which is further devoured by the bacteria and carried out from the septic tank through the discharge outlet through the field tile, carrying with it a certain amount of bacteria growth which will continue to be active in the field tile to keep the latter free and unobstructed.

It is the usual practice to deliver or discharge sewage in different forms into a septic tank for digestion. If the sewage solids are allowed to remain in the tank, both the effluent and settled sewage or sludge becomes offensive. I propose to subject the sewage to a bacteria growth which will quickly digest and disintegrate the solids of the sewage into a relatively fine silt which is further acted upon by the bacteria which ultimately completely devours and reduces the same to a fluid state which flows out the discharge outlet and then through the field tile. As a certain amount of the bacteria growth will be carried along with the effluent, the bacteria will be active to the extent of maintaining the field tile clean, unobstructed and free-flowing.

My bacteria activator for producing and activating the desired bacteria growth consists of mixing together in water, sugar, yeast, and corn meal. This mixture in the septic tank results in fermentation, created by the heat generated through decomposition and chemical reaction of the solid and raw sewage contained within the septic tank. Such action results in the release of gaseous bubbles. Such bubbles act to raise the solids of the sewage to the top of the fluid in the tank, where the bacteria growth eventually digests and devours the solids and disintegrates it into a relatively fine silt. The silt settles at the bottom of the tank where it is further devoured by the bacteria and reduced to a substantially fluid condition which with the effluent is carried out of the tank through the discharge outlet into the field. A certain amount of bacteria growth will be carried with the fluid and, as such bacteria remain active, the field tile are kept clean and unobstructed and substantially free from offensive odors.

The ingredients for producing one pound of the desired bacteria activator consist of the following:

|  | Oz. |
|---|---|
| Partially refined sugar, such as turbinado | 3 |
| White corn meal | 9 |
| Dry active yeast | 3 |
| Yeast food, consisting of flour, calcium sulfate, salt, ammonium chloride, and potassium bromate | 1 |

The above ingredients are thoroughly mixed together. Two pounds of the mix are dissolved in approximately five gallons of water which is sufficient to treat sewage within a five hundred gallon tank.

When the sugar, yeast and corn meal are mixed together in the water, they work together, causing a fermentation which is in the form of a gentle boiling action. The yeast is a natural bacteria plant life. The boiling action produces gaseous bubbles which rise to the top of the contents of the tank and in so doing raise the solids of the sewage where such solids are exposed to digestive action by the bacteria and eventually substantially devoured thereby and reduced to a relatively fine silt which tends to settle to the bottom of the septic tank where it is further devoured by bacterial action and reduced to substantially liquid form and thence carried by overflow action from the tank through the field tile. As a certain amount of the bacteria growth remains active in the overflow liquid, the field tile are kept clean and unobstructed as the bacteria continue to work in the field tile.

My improved bacteria activator when used in a septic tank will promote the growth of bacteria which quickly decompose and dissipate the raw and solid sewage in the manner hereinbefore stated and keep the septic tank operative and reduce to a minimum offensive odors resulting from the digestion process.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. The method of treating raw and solid sewage in a 500 gal. septic tank consisting of introducing into the sewage in the tank of bacteria activator consisting of: 6 oz. partially refined sugar, 18 oz. white corn mean, 6 oz. dry active yeast, 2 oz. yeast food containing flour, calcium sulfate, salt, ammonium chloride, and potassium bromate, mixed with approximately 5 gal. water.

2. The method of treating raw and solid sewage in a 500 gal. septic tank consisting of introducing into the sewage in the tank a bacteria activator which reduces the raw and solid sewage to a relatively fine silt, which silt is further substantially devoured by the bacteria and reduced to a liquid condition which is carried away with the effluent through the discharge outlet of the septic tank, said activator consisting of: 6 oz. partially refined sugar, 18 oz. white corn meal, 6 oz. dry active yeast, 2 oz. yeast food containing flour, calcium sulfate, salt, ammonium chloride, and potassium bromate, mixed with approximately 5 gal. water.

References Cited by the Examiner
UNITED STATES PATENTS

| 1,751,459 | 3/1930 | Simmer | 210—11 |
| 2,382,010 | 8/1945 | Hodges | 210—11 |
| 2,528,403 | 10/1950 | West | 210—11 |
| 2,572,767 | 10/1951 | Schlenz | 210—11 |

OTHER REFERENCES

Kirk, R. E., and Othmer, D. F., ed.: Encyclopedia of Chemical Technology, Interscience Publishers, Inc., N.Y., vol. 13, pages 209, 225.

DONALL H. SYLVESTER, *Primary Examiner.*

ANTHONY SCIAMANNA, *Examiner.*

T. KILEY, *Assistant Examiner.*